Patented Sept. 16, 1941

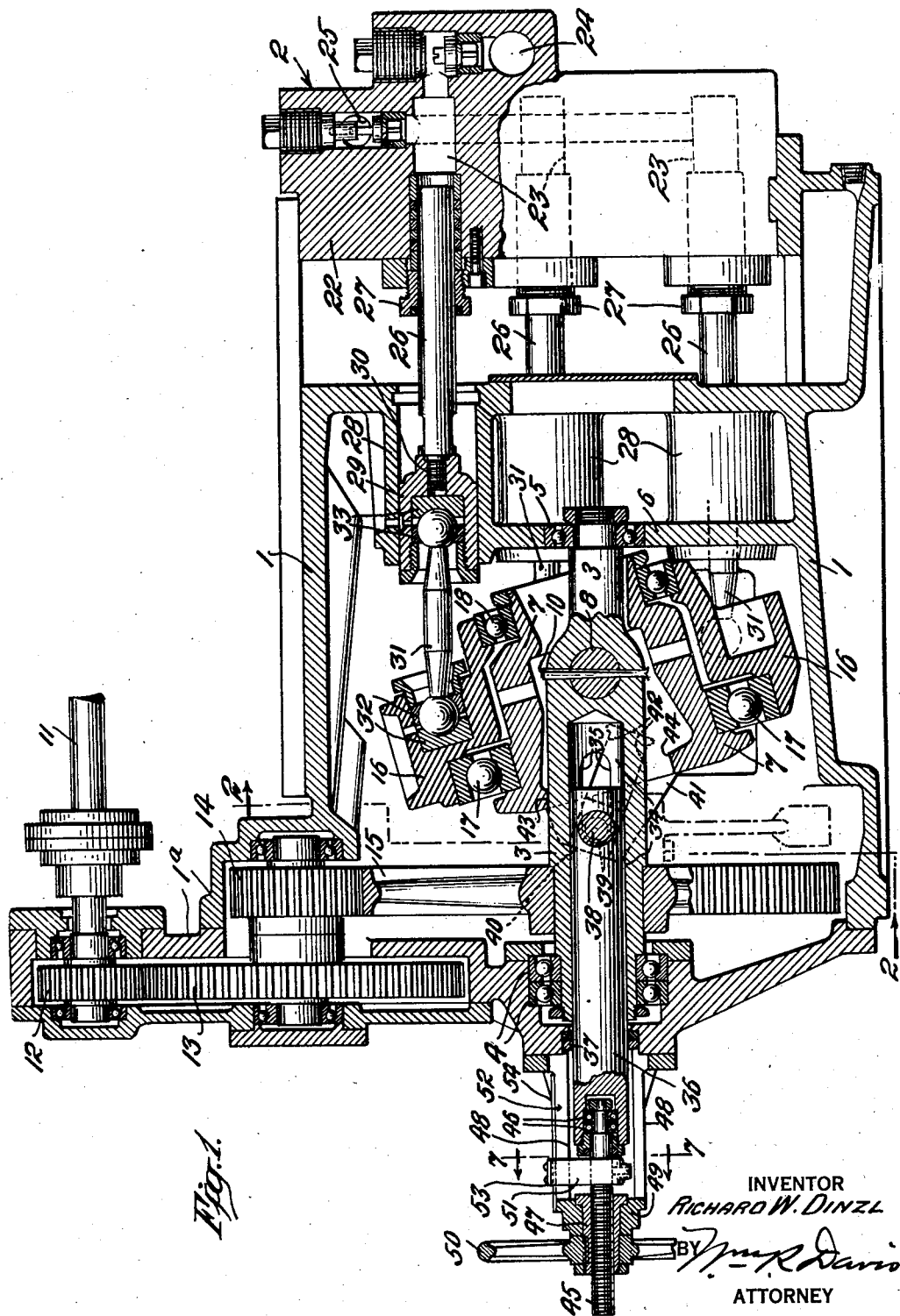

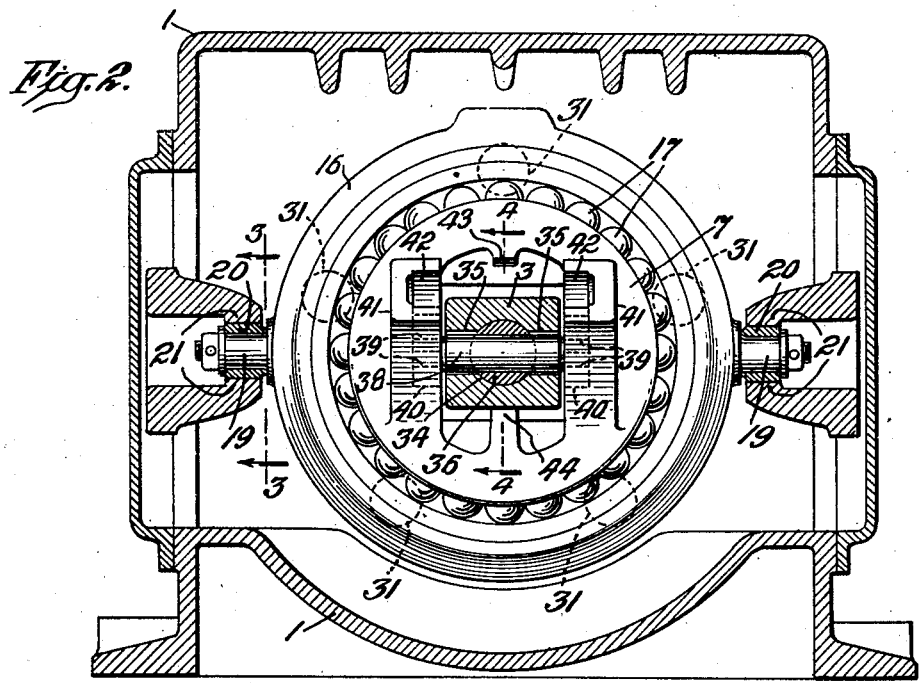

2,256,079

UNITED STATES PATENT OFFICE 2,256,079

SWASH PLATE MECHANISM

Richard W. Dinzl, Westfield, N. J., assignor to The Watson-Stillman Co., Roselle, N. J., a corporation of New Jersey Application December 3, 1940, Serial No. 368,365

9 Claims. (Cl. 103—162)

The present invention relates more particularly to improvements in a swash plate mechanism for operating a pump and in which the swash element or plate is adjustable to vary its pitch and thereby vary the volume of the pump delivery. An important object of the invention is to provide improved means for adjusting the pitch of the swash element. Other objects of the invention will appear hereinafter.

In the drawings,

Fig. 1 is a longitudinal sectional view of a swash unit and pump unit combined and embodying the invention;

Fig. 2 is a vertical cross section approximately on the line 2—2 of Fig. 1 and with the swash element swung to a neutral position;

Fig. 3 is a detail section on the line 3—3 of Fig. 2;

Fig. 4 is a section on the line 4—4 of Fig. 2 with parts broken away and with the swash element in maximum pitch position;

Fig. 5 is a detail section on the line 5—5 of Fig. 4;

Fig. 6 is a detail section on the line 6—6 of Fig. 4; and

Fig. 7 is a section on the line 7—7 of Fig. 1.

The swash plate mechanism is enclosed within a casing 1, and a hydraulic pump unit 2 is rigidly connected to said casing in a spaced relation to one end of the casing. Said mechanism includes a shaft 3 rotatably supported at one end by ball bearings 4 borne by the end wall of the casing remote from the pump unit and at its opposite end by a ball bearing 5 borne by an intermediate wall 6 of the casing. The bearings 4 are formed and supported to resist endwise thrust upon the shaft. A tubular swash element or hub 7 is mounted upon the shaft for rotation thereby and also for tiltable adjustment about a transverse axis at right angles to the shaft axis. The mounting for the swash element comprises a trunnion pin 8 having a tapered medial portion fitted within a tapered transverse bore in the shaft. Said pin has trunnion ends projecting from opposite sides of the shaft and fitting within bearing bushings 9 secured within diametrical bores in the swash element, as shown in Fig. 5. A cotter pin 10 secures the trunnion pin against rotation within the shaft bore. An enlarged medial portion of the shaft, extending into the swash element is square in cross section. A drive shaft 11, connected to a power source, not shown, is operatively connected to the shaft 3 through gears 12, 13, 14 and 15. Gear 15 is affixed to shaft 3, within the casing 1, and the other gears are housed within an extension 1ª of the casing.

A swash follower member 16 of annular form encircles the swash element or hub 7. Ball bearings 17 and 18 between the swash element and follower support the latter on the swash element and permit the swash element to rotate relatively to the follower about the axis of shaft 3. These bearings are formed and supported to resist axial thrust. At diametrically opposite sides thereof the follower has trunnion projections 19 rigid therewith and rotatable within bearing bores in a pair of blocks 20. These blocks are supported and retained for sliding in a common horizontal plane by guides 21 rigid with the casing. Thereby, the follower is held against rotation with the swash element 7 but is mounted for swash rocking movement by the swash element.

The pump unit 2 includes a body 22 formed of a metal block having pump cylinder bores 23 parallel to the axis of the shaft 3. In the present instance there are five of these bores equally spaced around the shaft axis. Each bore 23 is in valved connection, through bores in said block with a pump inlet bore 24 and a pump outlet bore 25. Each cylinder bore has a pump plunger 26 reciprocable therein through a stuffing box 27 and suitable packing. The adjacent end of the casing 1 is formed with guide cylinders 28 coaxial with the bores 23 respectively, and each having a piston 29 reciprocable therein. Each pump plunger has a screw-threaded connection 30 with one of said pistons. The swash follower 16 is operatively connected with the pistons by pull-and-push rods 31. Each of the latter has spherical ends, one retained in a spherical bearing 32 borne by the follower 16 and the opposite end retained in a spherical bearing 33 borne by the adjacent piston 29. The bearings 32 are equally spaced around the axis of the follower in accordance with the spacing of the pistons around the axis of shaft 3 and the spherical ends of the rods 31 are universally rockable within the bearings 32 and 33. Through the connections described, the swash rocking of the follower 16 will cause operation of the pump plunger to obtain continuous delivery from the pump unit.

Provision is made for varying the pitch or throw of the swash element 7 and its follower 16 and thereby varying the stroke of the pump plungers and the delivery from the pump unit. Shaft 3 has an axial bore 34 opening through its outer end. Near the inner end of this bore the shaft has a pair of longitudinal slots 35 diametrically located and opening outward from the bore to the exterior of the shaft. A pitch-adjusting plunger 36 is slidably fitted within the bore 34 and extends outward through an opening in the casing 1 provided with packing 37. Near its inner end the plunger 36 has a transverse bore within which a cross pin 38 is secured. This pin projects outward through the shaft slots 35 to the exterior of the shaft where it has reduced ends 39. Slide blocks 40 are pivotally mounted upon these ends and are operatively connected to the swash element 7. For said operative connection the swash element is formed, at the side thereof remote from the pump unit, with a pair of rigid similar brackets 41 located at opposite sides of the shaft 3. These brackets have straight cam slots 42 in a common plane oblique to the axis of the swash element, and so disposed as to be oblique to the axis of the shaft 3 in all positions of the swash element about the pin 8. The swash element bears a stop 43 engageable with one side of shaft 3 to limit tilting of said element to a position for maximum pitch, and a stop 44 to engage the opposite side of the shaft and stop the swash element in neutral position when it is swung in the opposite direction about its pivot 8. The slide blocks 40, borne by the plunger 36, slidably fit within said cam slots 42. Thereby shift of the plunger outward within the bore 34 causes tilting of the swash element to increase its pitch and shift of the plunger inward causes the swash element to be rocked about its pivot 8 to reduce its pitch.

Means are provided for manually adjusting plunger 36 inward and outward and maintaining its adjustments. At the outer end of the plunger there is a screw-threaded rod 45 coaxial with the plunger and having a pull-and-push swivel connection with the plunger including ball bearings 46. The swivel connection permits the plunger to rotate with the swash element without rotating said rod. An internally threaded sleeve or nut 47 is screw-engaged with said rod. A bracket 48 mounted upon the adjacent end of the casing is formed with a bearing 49 rotatably supporting said sleeve. The latter is secured against axial movement in the bearing and has a hand-wheel 50 keyed to it. By turning the hand-wheel the rod 45 and connected plunger 36 may be advanced or retracted, in either idle or running condition of the swash mechanism, to change the pitch of the swash element 7 and its follower 16 and thereby change the stroke of the pump plungers 26. A vertical arm 51 is secured to the threaded rod 45, at a point between the sleeve 47 and the said swivel connection, and projects upward through a slot 52 in the bracket 48. At its upper end said arm bears a pointer 53 to travel over a scale borne by a plate 54 secured to the upper side of the bracket, to indicate the pitch adjustment.

It will be seen that the invention provides very simple and conveniently operable means for accurately adjusting the pitch of the swash element. The construction of the adjusting means is such as to hold the swash element positively in any selected adjustment and prevent it from vibrating about its pivot 8.

What I claim is:

1. In a swash mechanism including a rotatably mounted shaft, and a swash element mounted upon said shaft for rotation thereby and for rocking about an axis transverse to the shaft axis to vary its pitch, said shaft having an axial bore, a pitch-adjusting plunger mounted for reciprocation along the shaft axis within said bore, slide blocks borne by said plunger, pivotal mountings for said blocks on the plunger supporting them at diametrically opposite sides of the shaft for rocking about an axis parallel to said transverse axis of the swash element, the shaft having longitudinal clearance slots for said block mountings, cam means rigid with the said swash element and forming cam slots at opposite sides of the shaft and slidably receiving said blocks and arranged in a common plane disposed to slope with reference to the shaft axis in all positions to which the swash element is rocked, whereby longitudinal shift of said plunger along the shaft axis will shift said blocks with it to act upon said cam means and rock the swash element to change its pitch, and screw means to adjust said plunger along the shaft axis and thereby adjust the pitch of the swash element.

2. In a swash pump mechanism including a rotatably mounted shaft, a swash element mounted upon said shaft for rotation thereby and for rocking about an axis transverse to the shaft axis to vary its pitch, and pump plungers spaced around the shaft axis and operable by the swash element, said shaft having an axial bore, a pitch-adjusting plunger mounted for reciprocation along the shaft axis within said bore, cam means rigid with the said swash element and forming cam slots at opposite sides of the shaft and arranged in a common plane disposed to slope with reference to the shaft axis in all positions to which the swash element is rockable, and cam-engaging means borne by said plunger and projecting transversely from opposite sides thereof to enter said cam slots and cooperate with said cam means to rock the swash element to change its pitch and thereby change the stroke of said pump plungers by shift of the pitch-adjusting plunger along the shaft axis, within said bore, the shaft being longitudinally slotted to afford clearance for said cam-engaging means to reach the cam slots and shift with the pitch-adjusting plunger.

3. In a swash mechanism including a rotatably mounted shaft, and a swash element mounted upon said shaft for rotation thereby and for rocking about an axis transverse to the shaft axis to vary its pitch, a pitch-adjusting element mounted for reciprocation along the shaft axis and for rotation with the shaft, an operative connection between said pitch-adjusting element and the swash element to change the pitch of the latter by shift of the pitch-adjusting element along the shaft axis, a screw-threaded rod extending in the direction of the shaft axis, a pull-and-push swivel connection between said rod and the pitch-adjusting element to shift the latter for changing the pitch of the swash element by shift of said rod axially, and an internally threaded rotatable member screwed upon said rod and secured against axial movement relatively to the shaft, for shifting said rod and pitch-adjusting element to change the pitch of the swash element by rotation of said internally threaded member.

4. A swash mechanism comprising a rotatably mounted shaft having an axial bore, a swash element mounted for rotation about the axis of said shaft and connected to the shaft for rotation thereby and mounted also for rocking about an axis transverse to the shaft axis to vary its pitch, a pitch-adjusting plunger mounted for reciprocation within said bore and constantly supported within the bore against displacement transversely of the shaft axis, and cam means rigidly borne by the swash element and operable by shift of said pitch-adjusting plunger along the shaft axis to rock the swash element to vary its pitch.

5. A swash mechanism comprising a rotatably mounted shaft having an axial bore, a swash element mounted for rotation about the axis of said shaft and connected to the shaft for rotation thereby and mounted also for rocking about an axis transverse to the shaft axis to vary its pitch, a pitch-adjusting plunger mounted for reciprocation within said bore and constantly supported within the bore against displacement transversely of the shaft axis, cam means rigidly borne by said swash element, and means borne by said plunger and projecting transversely therefrom to engage said cam means and cooperate therewith to rock the swash element to change its pitch by longitudinal movement of the plunger, the shaft being longitudinally slotted to afford clearance for said cam-engaging means to reach the cam means and permit movement of the cam-engaging means with the plunger.

6. A swash mechanism comprising a rotatably mounted shaft having an axial bore, a swash element mounted for rotation about the axis of said shaft and connected to the shaft for rotation thereby and mounted also for rocking about an axis transverse to the shaft axis to vary its pitch, a pitch-adjusting plunger mounted for reciprocation within said bore and constantly supported within the bore against displacement transversely of the shaft axis, cam means rigidly borne by said swash element and forming a cam slot extending longitudinally in a plane transverse to said shaft axis, and means borne by said plunger and projecting transversely therefrom into said cam slot to cooperate with the cam means to rock the swash element to change its pitch by longitudinal movement of the plunger.

7. A swash mechanism including a rotatably mounted shaft having an axial bore, a swash element mounted for rotation about the axis of said shaft and connected to the shaft for rotation thereby and mounted also for rocking about an axis transverse to the shaft axis to vary its pitch, a pitch-adjusting plunger mounted for reciprocation within said bore and constantly supported within the bore against displacement transversely of the shaft axis, an operative connection between said plunger and the swash element to rock the latter to vary its pitch by movement of the plunger along the bore, and screw means to adjust said plunger along the shaft axis and thereby adjust the pitch of the swash element.

8. A swash mechanism including a rotatably mounted shaft having an axial bore, a swash element mounted for rotation about the axis of said shaft and connected to the shaft for rotation thereby and mounted also for rocking about an axis transverse to the shaft axis to vary its pitch, a pitch-adjusting plunger mounted for reciprocation within said bore and constantly supported within the bore against displacement transversely of the shaft axis, an operative connection between said plunger and the swash element to rock the latter to vary its pitch by movement of the plunger along the bore, a plunger-adjusting element mounted for adjustment along the shaft axis, a push-and-pull swivel connection between said adjusting element and plunger to adjust the plunger back and forth by adjustment of the adjusting element back and forth and permit rotation of the plunger with the shaft relatively to the adjusting element, and screw means to adjust said adjusting element along the shaft axis to thereby adjust the plunger to change the pitch of the swash element.

9. In a swash mechanism the combination of a rotatably mounted shaft, a swash element mounted upon said shaft for rotation thereby and for rocking about an axis transverse to the shaft axis to vary its pitch, said shaft having an axial bore, a pitch-adjusting plunger mounted for reciprocation along the shaft axis within said bore, a pin extending transversely through the said plunger and through slots in the said shaft, the ends of said pin extending beyond opposite sides of the shaft, a pair of rigid brackets formed on the swash element at opposite sides of the shaft, means operatively connecting the projecting ends of said transverse pin to said rigid brackets, whereby the longitudinal shift of said plunger along the shaft axis will rock the swash element to change its pitch, and means to adjust said plunger back and forth along the shaft axis.

RICHARD W. DINZL.